(12) United States Patent
Hansen et al.

(10) Patent No.: US 7,698,788 B2
(45) Date of Patent: Apr. 20, 2010

(54) FASTENING CLIP WITH FLEXIBLE TETHER

(75) Inventors: Wayne M. Hansen, Poynette, WI (US); Mark Leuthe, Chippewa Falls, WI (US)

(73) Assignee: Illinois Tool Works Inc., Glenview, IL (US)

( * ) Notice: Subject to any disclaimer, the term of this patent is extended or adjusted under 35 U.S.C. 154(b) by 639 days.

(21) Appl. No.: 11/642,454

(22) Filed: Dec. 20, 2006

(65) Prior Publication Data

US 2007/0220716 A1 Sep. 27, 2007

Related U.S. Application Data

(60) Provisional application No. 60/786,208, filed on Mar. 27, 2006.

(51) Int. Cl.
E04F 19/02 (2006.01)
(52) U.S. Cl. .................................. 24/297; 280/728.1
(58) Field of Classification Search ............... 24/297, 24/453, 464, 532, 531, 545, 602, 573.09, 24/465, 466, 468, 478, 712.9, 460, 461, 462, 24/30.5 R, 67 R, 67.7; 280/728.1, 728.2, 280/730.2; 296/39.1; 248/74.1, 74.4
See application file for complete search history.

(56) References Cited

U.S. PATENT DOCUMENTS

| | | | |
|---|---|---|---|
| 2,937,834 A * | 5/1960 | Orenick et al. ............. | 248/71 |
| 5,163,795 A | 11/1992 | Benoit et al. | |
| 5,347,671 A * | 9/1994 | Hunts ..................... | 7/156 |
| 5,387,065 A | 2/1995 | Sullivan | |
| 5,398,960 A | 3/1995 | Ravenberg et al. | |
| 5,507,610 A | 4/1996 | Benedetti et al. | |
| 5,820,048 A * | 10/1998 | Shereyk et al. ........... | 248/68.1 |
| 5,979,929 A | 11/1999 | Stanger et al. | |
| 6,053,458 A | 4/2000 | Meyer | |
| 6,333,515 B1 | 12/2001 | Kubota et al. | |
| 6,394,695 B1 | 5/2002 | Chausset | |
| 6,431,585 B1 | 8/2002 | Rickabus et al. | |

(Continued)

FOREIGN PATENT DOCUMENTS

GB     2364092     1/2002

(Continued)

*Primary Examiner*—Robert J Sandy
*Assistant Examiner*—Rowland D Do
(74) *Attorney, Agent, or Firm*—Mark W. Croll; Paul F. Donovan

(57) ABSTRACT

A fastening clip with a flexible tether for use with a vehicle includes a first fastener attached to a component such as a vehicle body, and a second fastener attached to a removable component such as a vehicle trim panel. The first and second fasteners may be connected by generally rigid arms joined by an integral hinge and by at least one flexible tether capable of elongating and contracting. The hinged arms and tether provide multiple means to prevent the trim section from freely detaching from the vehicle body and becoming a projectile following deployment of an air bag from behind the trim panel. In addition, the rigid arms cause the trim panel to move in a controlled arc. A further aspect of the invention provides a tether that is capable of stretching to allow unimpeded air bag deployment followed by contracting to pull the trim panel back towards its original position on the vehicle body.

18 Claims, 3 Drawing Sheets

U.S. PATENT DOCUMENTS

| | | |
|---|---|---|
| 6,565,117 B2 | 5/2003 | Kubota et al. |
| 6,752,576 B2 | 6/2004 | Johansson et al. |
| 7,077,449 B2 | 7/2006 | Tokunaga |
| 7,114,686 B2 * | 10/2006 | Andrigo .................. 248/71 |
| 7,178,850 B2 * | 2/2007 | Smith et al. ............... 296/29 |
| D541,644 S * | 5/2007 | Aoki ...................... D8/383 |
| 7,380,758 B2 * | 6/2008 | Hauser .................. 248/68.1 |
| 2004/0016088 A1 * | 1/2004 | Angellotti ................ 24/297 |
| 2005/0062263 A1 | 3/2005 | Kawai et al. |
| 2005/0285374 A1 | 12/2005 | Kawai et al. |
| 2005/0285375 A1 | 12/2005 | Kawai et al. |
| 2007/0126211 A1 * | 6/2007 | Moerke et al. .......... 280/728.2 |

FOREIGN PATENT DOCUMENTS

| | | |
|---|---|---|
| JP | 09/315253 | 9/1997 |
| JP | 3422299 | 6/2003 |
| WO | WO 01/40667 A1 | 6/2001 |

* cited by examiner

FASTENING CLIP WITH FLEXIBLE TETHER

CROSS REFERENCE TO RELATED APPLICATIONS

This Non-Provisional Application claims benefit to U.S. Provisional Application Ser. No. 60/786,208, filed Mar. 27, 2006.

FIELD OF THE INVENTION

The present invention relates generally to fastening clips, and more specifically to fastening clips commonly associated with automobile applications, such as air bag release systems.

BACKGROUND OF THE INVENTION

It is known that air bags are used within vehicles for passenger safety in the event of an accident or collision. The known vehicle air bags are generally positioned within vehicle body components in the passenger area, typically behind detachable trim sections of the vehicle. When an air bag is activated or deployed, the associated trim within the vehicle pops off or otherwise separates from the body or sheet metal of the vehicle to allow full deployment of the air bag. It is desirable to prevent the trim from flying freely around the occupant compartment of the vehicle and potentially creating a safety hazard. To prevent this from happening, fasteners may be used that provide one or more generally flexible tethers that are attached to the vehicle trim. However, these fasteners with tethers offer little control over the movement and direction of the vehicle trim during and after an air bag is deployed.

The present invention addresses these and other drawbacks with known fastening clips and in particular fastening clips that may be used with vehicle air bag release systems.

BRIEF SUMMARY OF THE INVENTION

The current invention is directed to fastening clips that prevent vehicle trim from becoming projectiles within the passenger area of the vehicle during air bag deployment. Embodiments of the invention provide a flexible tether having a spring-like function to pull the trim back toward the sheet metal of the vehicle following air bag deployment. In addition, the fastening clip may include generally rigid arms attached to the vehicle body fastener and trim section fastener, joined by an integral hinge. The hinged arms provide another tether means to prevent the trim section from freely detaching from the vehicle body. Additionally, the hinged arms cause the vehicle trim to move within a controlled arc and therefore in a controlled manner.

Other features and advantages of the invention will become apparent to those skilled in the art upon review of the following detailed description, claims and drawings in which like numerals are used to designate like features.

DETAILED DESCRIPTION OF THE EMBODIMENTS

Figure 1:
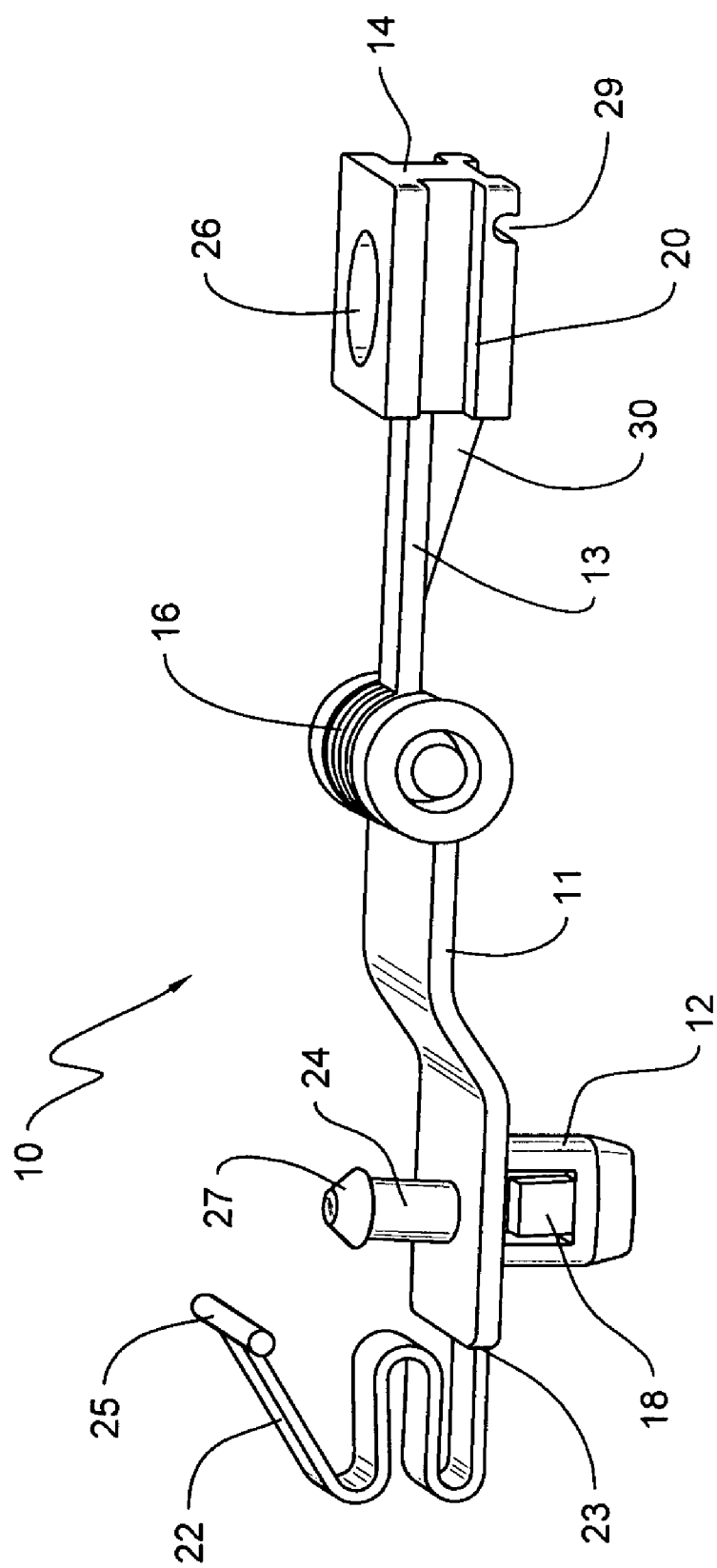
FIG. 1 illustrates a perspective view of an embodiment of the fastening clip of the invention, in an as-molded position prior to use.

The present invention may be embodied in many forms. Referring to the Figures, there are depicted various aspects of the invention. Referring to FIG. 1, an exemplary embodiment of a fastening clip 10 is illustrated, shown in an as-molded position prior to use. The fastening clip may be made of any suitable material, such as plastic. The fastening clip 10 may be integrally molded, forming a single component, or may be made of numerous parts assembled together.

The fastening clip 10 of FIG. 1 comprises a first fastener 12 and a second fastener 14 with a hinge 16 between the first and second fasteners. The first fastener 12 may be configured to provide an attachment portion 18 to attach the clip 10 to a component such as a vehicle body. The attachment portion 18 may include a flexible member (as shown in FIG. 1) that will permit the clip 10 to snap fit to a component of the vehicle body, as understood in the art. Fastener 12 can be of many different configurations suitable for the intended application. Clip 10 may include a first generally rigid arm 11 that extends from the attachment portion 18 of the fastener 12 to the hinge 16.

Clip 10 may also include a post 24 extending outwardly from the generally rigid arm 11 opposite the first fastener 12. The post 24 may include a frustum-shaped head 27. The post 24 is configured to mate with an aperture or hole 26 formed in fastener 14, and the head 27 will permit the fastener 14 to snap-fit to the post 24, thereby holding the fastener 14 to the post 24. Other shapes, structure or configurations are possible and the male/female combination is merely an example of one arrangement for connecting first fastener 12 to second fastener 14.

Fastener 14 may include a connection portion 20 to connect the fastener 14 to a removable part of a vehicle, for example, a vehicle trim panel. The connection portion 20 may define any configuration that may be used to connect the fastener 14 of the clip 10 to a removable part of a vehicle. A second generally rigid arm 13 may extend from the connection portion 20 of the second fastener 14 to the integral hinge 16. A supporting rib 30 may be used to reinforce the connection portion 20 to the arm 13. Fastener 14 may also include the aperture 26 formed in the fastener 14 for receiving the post 24 of the fastener 12, when in an assembled position (as shown by FIG. 2).

Referring to FIG. 1, fastening clip 10 may include a flexible tether 22 with two ends, a first end 23 attached to arm 11 and a second end 25 that is attachable to fastener 14 and, more specifically, to slot 29 formed in the fastener 14. Referring to FIG. 2, where the fastening clip 10 is illustrated in an assembled configuration, the fasteners 12 and 14 are further connected to each other through the flexible tether 22. As shown, the second end 25 preferably cooperates with a mating portion 29 formed in the fastener 14. In one embodiment, the second end 25 includes a cylindrical portion that is adapted to snap-fit into slot 29. In addition, fasteners 12 and 14 may be directly attached or snapped together when the integral hinge 16 is in a closed position (as illustrated by FIG. 2). In one embodiment, this is accomplished by the post 24 engaging with the aperture 26, as discussed above.

Figure 2:
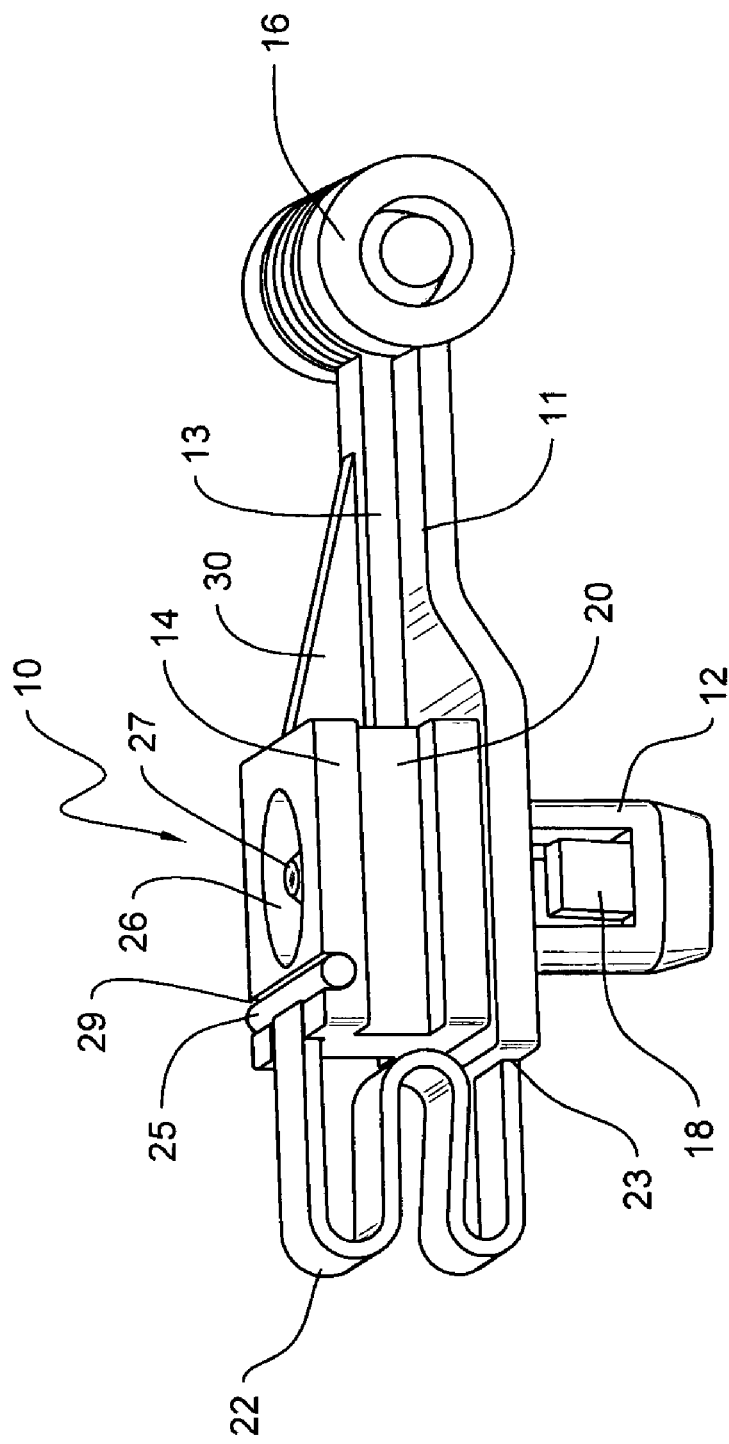
FIG. 2 illustrates a perspective view of the embodiment of FIG. 1 in an assembled position.

As shown in FIG. 2, the flexible tether 22 is in an original, non-stretched position. The flexible tether 22 is configured to elongate when the fastening clip 10 is opened and the fasteners 12, 14 separate. This would occur, for example, when an air bag is deployed and the trim panel that is attached to fastener 14 is forced away from its mounted position by the force of the air bag. The flexible tether 22 will remain attached to both fasteners 12, 14 during separation of the fastener 14 from fastener 12, caused by deployment of the air bag. The tether 22 is also configured to contract or spring back, thereby pulling the fasteners 12, 14 back towards each other, after they have been separated in the event of the air bag deploying. In other words, the tether will pull the fastener 14 and accompanying trim panel, for example, back towards the fastener 12 and the sheet metal to which the fastener 12 is mounted, thereby preventing the trim panel from becoming a projectile during deployment of the air bag.

The tether 22 may be made from the same material as the fasteners 12, 14, or it may be made of a material different from the material of the fasteners 12, 14. The tether may be made of any other suitable material capable of elongating when the fastening clip 10 is opened and then contracting, or springing back, to pull the first and second fasteners back towards each other. Exemplary materials include plastic, rubber and other elastomers; however, any other suitable material that may provide acceptable resiliency may be used. The tether may also be over-molded or molded in a two-shot operation.

The integral hinge 16 may be a swivel hinge molded as a single integral piece. The swivel hinge may include a swivel shaft that may be journaled for rotation within the ends of arms 11, 13, as understood by those skilled in the art. The hinge may define an open position (FIG. 1) and a substantially closed position (FIG. 2). A suitable hinge may be the hinge described in commonly owned U.S. Pat. No. 6,053,458, which is incorporated by reference in its entirety. It should be understood that other suitable hinges are contemplated and may be used with the invention.

Figure 3:
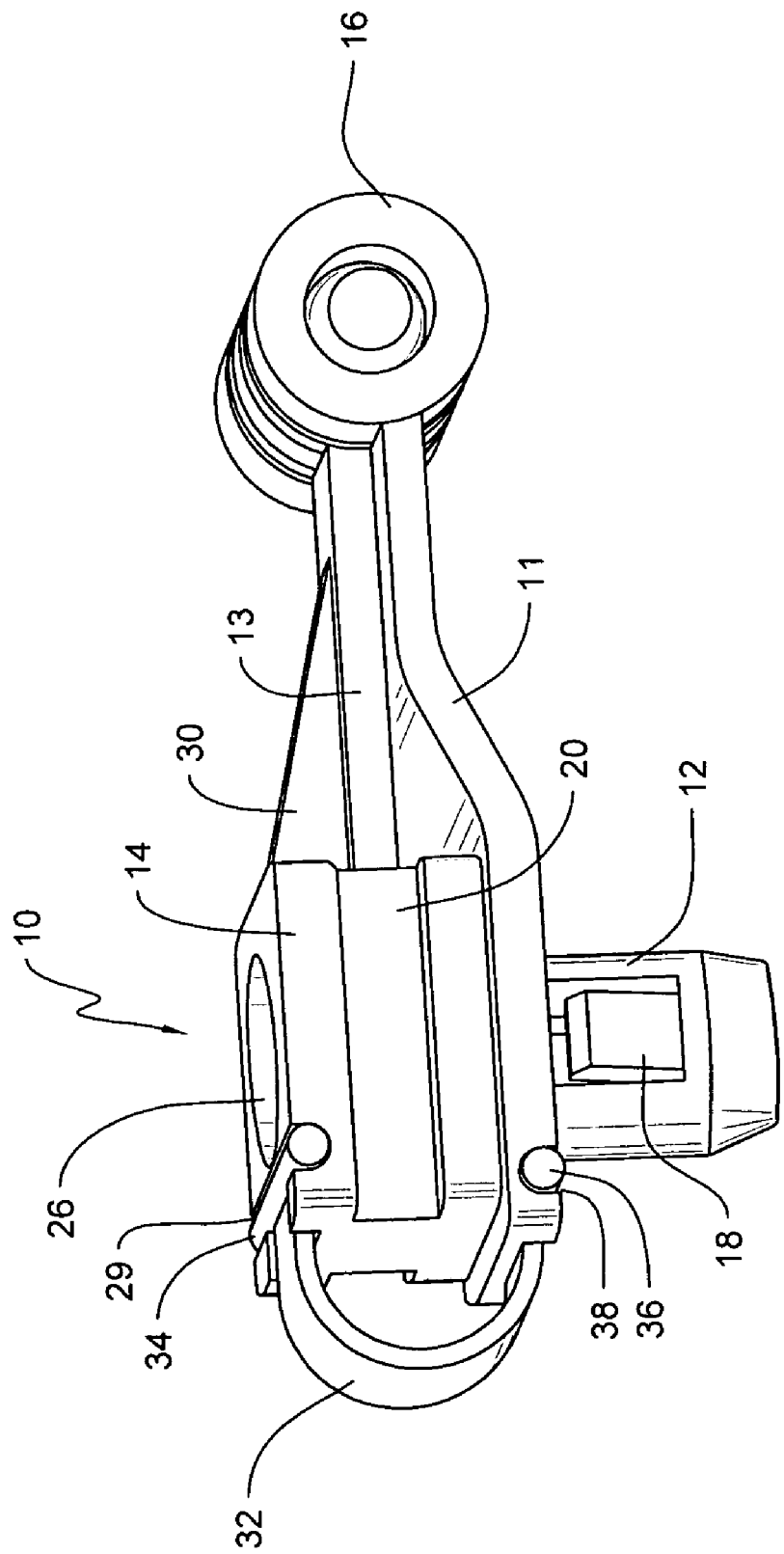
FIG. 3 illustrates a perspective view of an embodiment of the fastening clip of the invention having a tether with a different configuration and made from a different material than the other portions of the clip.

FIG. 3 shows an embodiment of the fastening clip 10 comprising a tether fabricated as a separate piece from the rest of the clip 10. More specifically, tether 32 may comprise end 34 attachable to the slot 29 formed in the fastener 14, as described above, and may comprise end 36 attachable to a slot 38 formed in the arm 11, similar to the attachment technique described above with respect to end 25 and slot 29. As the fasteners 12 and 14 separate and the swivel hinge moves to an open position, the flexible tether will stretch during this movement. The elasticity or resiliency of the tether will cause the tether to spring or contract back towards its original position, thereby pulling the fasteners 12 and 14 towards each other. It should be understood that more than one tether may be used to connect the first and second fasteners 12, 14. Thus, the clip 10 may comprise at least two flexible tethers attachable to the first and second fasteners 12, 14.

In another aspect of the invention, the generally rigid first arm 11 and second arm 13 provide for the fastening clip 10 to open in a controlled arc relative to the integral hinge 16. Consequently, as the fastening clip 10 is opened, in the event of an air bag deployment, the trim panel, for example, attached to the second fastener 14 may predictably move only along the arc that is determined by the length of the generally rigid second arm 13, as opposed to a random direction caused by the bouncing or dangling of the component at the end of the flexible tether. This permits controlled movement of the trim panel.

Yet another aspect of the invention provides the fastening clip 10 with more than one connection between the first fastener 12 and the second fastener 14. Consequently, if either one of the tether or the integral hinge were to become damaged and/or fail during use, a backup would remain to prevent the component attached to the second fastener 14 from becoming a projectile if the fastening clip was caused to be opened.

With respect to all the embodiments described herein, an aspect of the invention relates to a vehicle air bag application, for example, wherein the tether, connecting the first and second fasteners, is capable of stretching to both allow the air bag to deploy from behind a trim panel without interference from the fastening clip and to prevent the trim panel from freely separating from the vehicle body. A further aspect of the invention provides a tether connecting the first and second fasteners that is capable of stretching to allow unimpeded air bag deployment and also contracting to pull the trim panel back towards its original position on the vehicle body. A tether that springs back following elongation during air bag deployment may decrease the probability of the trim piece coming into contact with an occupant, cargo or other portions of the vehicle. Additionally, the first and second hinged arms control the movement of the trim panel during air bag deployment. Moreover, the hinged arms and tether provide multiple means to prevent the trim section from freely detaching from the vehicle body and becoming a projectile following deployment of the air bag from behind the trim panel.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A fastening clip for use within a vehicle comprising:
a first fastener having a first arm;
a second fastener having a second arm;
a hinge joining the first and second arms, wherein when the hinge is in an open position, the first arm extends in one direction from the hinge and the second arm extends in an opposite direction from the hinge, and wherein when the hinge is in a substantially closed position, the first and second arms are positioned one over the other so that both extend in the same direction from the hinge; and
at least one flexible tether having a first end attached to the first fastener and a second end attachable to the second fastener, wherein when the hinge is in the substantially closed position, the at least one flexible tether is in a non-stretched condition defining a first length between the first end and the second end, and wherein when the hinge is caused to move from the substantially closed position to a generally open position, the at least one flexible tether is in an elongated stretched condition defining a second length between the first end and the second end such that the second length is greater than the first length, and wherein the tether is configured to spring back from the generally open position to pull the first fastener and the second fastener towards each other.

2. The fastening clip of claim 1, wherein the fastening clip is integrally molded.

3. The fastening clip of claim 1, wherein the tether is comprised of a first material and the first and second fasteners are comprised of a second material.

4. The fastening clip of claim 1, wherein the first fastener includes a post.

5. The fastening clip of claim 1, wherein the second fastener is configured to engage the first fastener when the hinge is in the substantially closed position.

6. The fastening clip of claim 1, wherein the tether is configured to spring back following elongation.

7. The fastening clip of claim 4, wherein the second fastener includes an aperture for mating engagement with the post.

8. A fastening clip for use in a vehicle comprising:
   a first fastener including a first generally rigid arm and a post;
   a second fastener including a second generally rigid arm and an aperture;
   a hinge joining the first and second fasteners, wherein the hinge is positioned between the first generally rigid arm and the second generally rigid arm; and
   a tether having a first end attachable to the first fastener and a second end attachable to the second fastener, the tether configured to stretch and elongate in a direction extending between the first end and the second end for permitting the first fastener and the second fastener to move to an open position, and the tether further configured to spring back following elongation for pulling the first fastener and the second fastener towards each other.

9. The fastening clip of claim 8, wherein the first fastener includes an attachment portion and the second fastener includes a connection portion.

10. The fastening clip of claim 8, wherein the tether is comprised of a first material and the first and second fasteners are comprised of a second material.

11. The fastening clip of claim 8, wherein the tether is not stretched when the hinge is in a substantially closed position.

12. The fastening clip of claim 11, wherein the aperture of the second fastener is configured to engage the post of the first fastener when the hinge is in a substantially closed position.

13. The fastening clip of claim 12, wherein the tether is configured to stretch while the hinge is moved to a generally open position.

14. A fastening clip for use in a vehicle comprising:
   a first fastener including a first arm, a post and an attachment portion;
   a second fastener including a second arm, an aperture, a connection portion and a slot, said post of said first fastener configured to engage the aperture of said second fastener for attachment of the first fastener to the second fastener;
   a hinge joining the first and second fasteners, the hinge defining an open position and a substantially closed position, wherein the second fastener is configured to attach to the first fastener when the hinge is in the substantially closed position; and
   a flexible tether having a first end attached to the first fastener and a second end attachable to the slot of the second fastener, the tether configured to contract to pull the first and second fasteners towards each other following elongation of the tether.

15. The fastening clip of claim 14, wherein the tether is comprised of a first material and the first and second fasteners are comprised of a second material.

16. The fastening clip of claim 14, wherein the tether is not stretched when the hinge is in the substantially closed position.

17. The fastening clip of claim 14, wherein the second fastener is configured to be detachable from the first fastener, and the separation of the first and second fasteners causes the hinge to open.

18. The fastening clip of claim 17, wherein the tether is configured to stretch while the hinge is moved to a generally open position.

* * * * *